(12) United States Patent
Barbaste et al.

(10) Patent No.: US 12,554,328 B2
(45) Date of Patent: Feb. 17, 2026

(54) HARDWARE-AGNOSTIC MULTIMODAL BRAIN-COMPUTER INTERFACE POWERED BY A GENERATIVE ARTIFICIAL INTELLIGENCE NEURAL FOUNDATION MODEL AND COGNITIVE AI AGENTS

(71) Applicant: INCLUSIVE BRAINS, Marseilles (FR)

(72) Inventors: Paul Harold Aristide Barbaste, l'Etang la Ville (FR); Olivier Michel Pierre Edouard Oullier, Marseilles (FR)

(73) Assignee: INCLUSIVE BRAINS, Marseilles (FR)

( * ) Notice: Subject to any disclaimer, the term of this patent is extended or adjusted under 35 U.S.C. 154(b) by 0 days.

(21) Appl. No.: 19/273,716

(22) Filed: Jul. 18, 2025

(65) Prior Publication Data
US 2026/0023432 A1    Jan. 22, 2026

(30) Foreign Application Priority Data

Jul. 19, 2024    (EP) .................................. 24306219

(51) Int. Cl.
*G06F 3/01*    (2006.01)
*G06N 20/00*    (2019.01)

(52) U.S. Cl.
CPC .............. *G06F 3/015* (2013.01); *G06N 20/00* (2019.01)

(58) Field of Classification Search
CPC .......... G06F 3/011; G06F 3/015; G06F 3/017; G06N 20/00–20; A61B 5/6868
See application file for complete search history.

(56) References Cited

U.S. PATENT DOCUMENTS

| | | | |
|---|---|---|---|
| 8,868,174 B2* | 10/2014 | Sato ....................... | A61B 5/369 600/545 |
| 10,606,353 B2* | 3/2020 | Ce Coleman .......... | G16Z 99/00 |
| 11,199,904 B2* | 12/2021 | Sereshkeh .............. | A61B 5/374 |
| 12,189,854 B2* | 1/2025 | Ce Coleman .......... | G06N 3/126 |
| 12,414,658 B2* | 9/2025 | Dally ..................... | A61B 42/50 |
| 2012/0035765 A1* | 2/2012 | Sato ........................ | G06F 3/015 600/300 |

(Continued)

FOREIGN PATENT DOCUMENTS

CN            114564743 A      5/2022

OTHER PUBLICATIONS

Search Report issued on Dec. 13, 2024, in corresponding European Application No. 24 30 6219.7, 2 pages.

(Continued)

*Primary Examiner* — Patrick F Marinelli
(74) *Attorney, Agent, or Firm* — Maier & Maier, PLLC

(57) ABSTRACT

A device (6) for associate physiological signals from a user (51), the physiological signals being multimodal physiological signals, with commands of a brain-computer interface—BCI—(71) using a trained user-specific machine learning system, and a device for training the trained user-specific machine learning system. Specifically, a hardware-agnostic, multimodal BCI powered by generative artificial intelligence, cognitive AI agents, and Riemannian geometry, with reinforcement learning techniques aimed at making the BCI adaptive to each user's cognitive and affective states, and physicality, by translating the physiological and neurophysiological signals into passive and active (mental) commands of connected devices and digital environments.

17 Claims, 6 Drawing Sheets

(56) References Cited

U.S. PATENT DOCUMENTS

2019/0107888 A1* 4/2019 Sereshkeh .............. A61B 5/374
2019/0113973 A1* 4/2019 Coleman ................ G16H 50/70
2020/0218350 A1* 7/2020 Coleman ................ G16H 50/20

OTHER PUBLICATIONS

Beraldo et al., "Brain-Computer Interface Meets ROS: A Robotic Approach to Mentally Drive Telepresence Robots", arXiv: 1712.01772v2, Apr. 4, 2019, 6 pages.

* cited by examiner

HARDWARE-AGNOSTIC MULTIMODAL BRAIN-COMPUTER INTERFACE POWERED BY A GENERATIVE ARTIFICIAL INTELLIGENCE NEURAL FOUNDATION MODEL AND COGNITIVE AI AGENTS

FIELD

The present invention relates to a method and device for analysis of physiological and neural signals collected from a subject to translate into passive and active commands for a brain-computer interface device. More in detail, the present invention relates to a hardware-agnostic multimodal brain-computer interface powered by generative artificial intelligence, cognitive AI agents and Riemannian geometry.

BACKGROUND

A brain-computer interface (BCI) represents a transformative technological system that establishes a direct and unprecedented communication link between human brain activity and external connected devices, such as computers, prosthetics, or other machinery. BCIs transcend traditional modes of human-machine interaction by enabling the translation of intricate physiological signals, neural signals and brain activity patterns into actionable commands for the external device, without the need to rely on conventional control channels involving movement, touch or voice. The advent of BCIs has sparked profound possibilities in numerous domains, including healthcare, assistive technologies, and human-machine symbiosis.

Central to the concept of BCIs is their capacity to decode the physiological and neural information generated within the body including the brain's intricate networks of neurons. This decoding process entails the analysis and interpretation of electromyographic, (EMG), electrooculographic (EoG), electroencephalographic (EEG) signals, neural spikes, and oscillations, or signals coming from methods to estimate hemodynamic responses in the brain such as functional magnetic resonance imaging (fMRI) data as well as methods to analyze facial expressions and track eye movements (eye-tracking). By capturing these physiological and neural signatures, BCIs allow for the extraction of valuable insights into the user's cognitive, affective and sensorimotor intentions. These intentions can then be translated into concrete actions to be executed by an external device, ranging from commanding a computer to perform intricate tasks, a vehicle such as a wheelchair, controlling robotic prosthetics with various degrees of precision, or even enabling a non-verbal form of communication for individuals with severe motor disabilities.

While BCIs hold immense promise, they are not without their challenges. One pivotal challenge involves the accurate and robust interpretation of the wealth of physiological and neural data generated by the user, and by the interactions of the user with the various environments (s)he evolves in (e.g. physical, socio-economic, digital). BCIs must effectively distinguish between signals corresponding to various commands, all while accounting for factors like signal noise, user-specific and contextual variations. Moreover, BCIs often require an initial calibration phase, during which the system adapts to the transient or more stable physiological and/or neural patterns of the user. This calibration process, particularly when conducted for users unfamiliar to the system, can be time-consuming and demanding, limiting the ease of BCI adoption. Another essential consideration is that generally BCIs do not possess the ability to adapt immediately (i.e., learn), so that for example if the various multimodal sensors are detached and then reattached, it is often necessary to repeat the calibration process.

Considering these multifaceted technical demands and opportunities, the present invention endeavors to offer an innovative solution to address these limitations and elevate the capabilities of BCIs. This invention seeks to advance the state of the art in brain-computer interfaces not solely by decreasing the initial calibration duration when the BCI is first employed but also to enable the system to retain and acquire knowledge with each successive use by the same individual, ultimately reaching a zero-shot calibration process.

The integration of foundation models into BCI systems provides a significant advancement by leveraging large-scale AI models pre-trained on vast amounts of data. These models enable the development of highly specialized applications across various domains by fine-tuning their broad capabilities to specific tasks. In this context, foundation models enhance the accuracy and efficiency of decoding neural signals, thereby providing better insights about the intentions of the users and reducing the calibration time of the said interface. Moreover, the distinction between passive and active BCIs brings forth the potential for a more seamless and intuitive user experience. Passive BCIs, which automatically generate responses based on the user's brain activity patterns without conscious effort, allow the system to adapt in real-time to the user's mental state, enhancing interaction by adjusting parameters such as the difficulty level of a task or the environment in a virtual reality setting. On the other hand, active BCIs, which require deliberate mental actions, provide precise control over external devices, enabling tasks like operating prosthetic limbs or navigating a computer interface through intentional thought processes.

AI agents further augment the BCI system by autonomously interacting with human users, perceiving environmental changes, processing sensor data, and performing tasks to achieve specific goals. The incorporation of multimodal detection further enriches this capability by allowing AI agents to simultaneously process and integrate diverse physiological and neural data sources-such as EMG, EEG, fMRI, ECG, PPG, and eye-tracking signals. This multimodal approach ensures more robust and accurate interpretation of user states and commands, adapting more effectively to variations and noise in the signals. Cognitive AI agents can detect cognitive and affective states, while command AI agents interpret active commands. A supervisor AI agent, functioning as the output of the probability accumulator, ensures that the system adapts and learns from each interaction, thereby continuously improving performance and user experience. The combination of these advanced AI elements within the BCI framework significantly enhances the efficacy and user-friendliness of brain-computer interfaces.

SUMMARY

This invention thus relates to a device for training a user-specific machine learning system configured to associate physiological signals, being multimodal physiological signals, from a user with a command of a multimodal brain-computer interface, said device comprising:
    at least one input configured to receive sets of physiological signals acquired from a plurality of subjects from a database, and iteratively receive at least one set of physiological signals acquired from the user, each set of physiological signals comprising at least two physiological signals being acquired by at least two distinct sensors, wherein one of the at least two physiological signals is a neurophysiological signal acquired from at least one electrode of an electroencephalograph on one subject (i.e., individual) of said plurality of subjects or said user; wherein said (subjects') physiological signals of said sets of subjects' physiological signals from the database are associated to labels;

at least one processor configured obtain said user-specific machine learning system by:

dividing each received physiological signal into at least one floating time window, each floating time window being associated to an event of interest in said received physiological signal;

extracting (subjects') features from floating time windows derived from dividing said neurophysiological signals of said sets of subjects' physiological signals from the plurality of subjects: computing a covariance matrix for each floating time window, projecting said covariance matrix into a tangent space of subjects features representation and extracting said features from said projection in the tangent space;

extracting features from said floating time windows derived from dividing said physiological signals, excluding the neurophysiological signals, from the plurality of subjects;

generating a generic training dataset using said extracted features (i.e., features extracted from said sets of physiological signals acquired from a plurality of subjects);

training a generic classification model using said generic training dataset so to obtain a trained generic classification model configured to associate an input to one class, among a plurality of classes; said input comprising at least said features extracted from at least one set of physiological signals acquired from a user, being measured by at least two distinct sensors, wherein one of the at least two physiological signals is a neurophysiological signal; and each class of said plurality of classes being associated to one executable command of a brain-computer interface;

generating an updated fine-tuned user-specific model on the base of said trained generic classification model for each iteratively received set of user physiological signals using a transfer learning technique, said updated fine-tuned user-specific model being configured to provide as output class prediction;

obtaining probability distributions for said plurality of classes by feeding features obtained from at least one iteratively received set of user physiological signals to said updated fine-tuned user-specific model;

optimizing an AI agent with an early stopping algorithm using class predictions previously obtained from the updated fine-tuned user-specific model obtaining optimized parameter for said early stopping algorithm; wherein said early stopping algorithm is configured to receive as input at least two probability distributions of said plurality of classes obtained from two successive input of said updated fine-tuned user-specific model and provides as output an updated probability distribution for the plurality of classes being associated to one executable command of a brain-computer interface;

wherein said user-specific machine learning system comprises said updated fine-tuned user-specific model, said optimized AI agent and mapping rules configured to associate said updated probability distribution to one executable command for said brain-computer interface;

at least one output configured to provide at least the training parameters of said updated fine-tuned user-specific model and said optimized parameter of the optimized early stopping algorithm and said mapping rules.

According to other advantageous aspects of the invention, the device comprises one or more of the features described in the following embodiments, taken alone or in any possible combination.

According to one embodiment, generating said updated fine-tuned user-specific model using a transfer learning technique, comprises:

obtaining a tangent space of user features representation of the neurophysiological signals of said iteratively received set of user physiological signals;

aligning said tangent space of subjects features representation with said tangent space of user features representation;

during a first user-specific calibration of said user-specific machine learning system, updating said trained generic classification model using said aligned tangent spaces, obtaining updated training parameters for said updated fine-tuned user-specific model, or else updating a previously obtained fine-tuned user-specific model obtaining updated training parameters for said updated fine-tuned user-specific model.

According to one embodiment, additional features are from augmented floating time windows generated by performing data augmentation on floating time windows derived from dividing said sets of subjects' physiological signals.

According to one embodiment, the early stopping algorithm is a Cumulative Probabilities Accumulation algorithm, preferably Cumulative Probabilities Accumulation algorithm is a Bayesian Accumulation of Riemannian Probabilities (BARP).

According to one embodiment, the at least one processor is further configured to:

before using transfer learning technique, obtain an information representative of effectiveness and robustness of the previously obtained fine-tuned user-specific model; and whenever the effectiveness and robustness are not satisfying a predefined rule, perform data augmentation of the iteratively received set of user physiological signals or perform data augmentation of a covariance matrix computed using the iteratively received set of user physiological signals, and obtain said tangent space of user features representation using said augmented user physiological signals or augmented user covariance matrix.

According to one embodiment, the training of said trained generic classification model is a weakly or fully supervised training.

According to one embodiment, the at least one processor is further configured to, prior to generating said generic training dataset, sort said floating time windows based on a signal quality index computation and remove from the generic training data the n floating time windows, n being a predefined natural number, having the lowest signal quality index.

According to one embodiment, the at least one processor is configured to implement an incremental reinforcement learning technique:

obtain a quality metric of the current user-specific machine learning system using a user feedback or a passive feedback based on the user mental state (i.e., a mental state of the user or in other words a cognitive or an affective state of the user), calculated with the latest received at least one set of physiological signals acquired from the user;

whenever the quality metric satisfies a predefined quality criterion generate at least one set of labeled user physiological signals by associating at least two user physiological signals used as input of the current user-specific machine learning system with the corresponding outputted executable command and save said set of labeled user physiological signals in the database.

According to one embodiment, said executable command belongs to one among an active command associated to a voluntary action of said user or to a passive command associated with a mental state of said user.

According to one embodiment, the at least one processor is further configured to, prior to dividing said at least two physiological signals into floating time windows, remove artifacts from said at least two physiological signals.

According to one embodiment, the at least one processor is further configured to implement phase correction and filtering on said at least two physiological signals.

The invention further relates to a device for associating physiological signals from a user, said physiological signals being multimodal physiological signals, with commands of a brain-computer interface using a trained user-specific machine learning system obtained using the device for training according to any one of the embodiments cited here above, wherein said device comprises:

at least one input configured to iteratively receive at least one set of physiological signals acquired from said user, each set of physiological signals comprising at least two physiological signals being measured by at least two distinct sensors, wherein one of the at least two physiological signals is a neurophysiological signal acquired from at least one electrode of an electroencephalograph on said user;

at least one processor configured to:
divide each received physiological signal into at least one floating time windows, each floating time windows being associated to an event of interest in said received physiological signal;
extract (subjects') features from floating time windows derived from dividing said neurophysiological signal of said at least one set of physiological signals acquired from said user: computing a covariance matrix for each floating time window, projecting said covariance matrix into a tangent space of features representation and extracting said features from said projection in the tangent space of features;
extract features from said floating time windows derived from dividing said at least one set of physiological signals, excluding the neurophysiological signal;
obtaining probability distributions for a plurality of classes by sequentially providing said features extracted from said at least one set of physiological signals as input to an updated fine-tuned user-specific model of said trained user-specific machine learning system, the updated fine-tuned user-specific model being configured to classify each floating time window, and obtaining as output a classification of each floating time window into one class, from said plurality of classes; each class of said plurality of classes being associated to one executable command of a brain-computer interface;
provide as input to an AI agent, comprising an optimized early stopping algorithm of said trained user-specific machine learning system, at least two probability distributions of said plurality of classes obtained from two successive inputs (i.e., floating time windows), so to obtain as output an updated probability distribution for said plurality of classes associated to the latest floating time window obtained from the iteratively received user set of physiological signals;
cumulate said probability distributions of said plurality of classes for each floating time window to a buffer;
whenever a predefined level of confidence is reached for the cumulative probability in said buffer for one class, select at least one executable command associated to said class;
at least one output configured to provide said selected at least one executable command.

According to one embodiment, said at least one processor is further configured to perform a quality check by calculating a signal quality index on said user set of physiological signals, to obtain information allowing to prompt said user to adjust said at least two distinct sensors if a quality criterion is not met by said computed quality check.

According to one embodiment, floating time windows are ignored during a recovery period applied after each selection of at least one executable command.

According to one embodiment, the predefined level of confidence is defined as a ratio between the probabilities associated to the two most probable classes.

In addition, the disclosure relates to a computer program comprising software code adapted to perform a method for controlling or a method for training compliant with any of the above execution modes when the program is executed by a processor.

The present disclosure further pertains to a non-transitory program storage device, readable by a computer, tangibly embodying a program of instructions executable by the computer to perform a method for controlling or a method for training, compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM, an EPROM (Erasable Programmable ROM) or a Flash memory, a portable CD-ROM (Compact-Disc ROM).

Definitions

In the present invention, the following terms have the following meanings:

It is noteworthy that brain-computer interfaces (BCIs) can also be referred to as human-machine interfaces (HMIs), human-computer interfaces (HCIs), brain-machine interfaces (BMIs) or neural interfaces these days. In the case of multimodal interfaces that empower human individuals to control external connected devices and digital environments. In general, and therefore in the context of this text and the present invention, the terms BCI, HCI, HMI, BMI and neural interfaces can be used to describe the multimodal interface at the core of the present invention in an interchangeable fashion.

The terms "adapted" and "configured" are used in the present disclosure as broadly encompassing initial configuration, later adaptation or complementation of the present device, or any combination thereof alike, whether effected through material or software means (including firmware).

The term "processor" should not be construed to be restricted to hardware capable of executing software, and refers in a general way to a processing device, which can for example include a computer, a microprocessor, an integrated circuit, or a programmable logic device (PLD). The processor may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory), a ROM (Read-Only Memory) or a DNA-storage system. Instructions may be notably stored in hardware, software, firmware or in any combination thereof.

"Data" refers to a collection of observations, measurements, or values that represent a signal. These observations can be discrete or continuous and typically capture the characteristics or attributes of a physiological signal over a specific time or spatial domain. In the present text, the term data encompasses the raw or processed values that capture the essential properties of a signal.

"Machine learning (ML)" designates in a traditional way computer algorithms improving automatically through experience, on the ground of training data enabling to adjust and fine-tune parameters of computer models through gap reductions between expected outputs extracted from the training data and evaluated outputs computed by the computer models.

A "hyper-parameter" presently means a parameter used to carry out an upstream control of a model construction, such as a remembering-forgetting balance in sample selection or a width of a time window, by contrast with a parameter of a model itself, which depends on specific situations. In ML applications, hyper-parameters are used to control the learning process.

The term "trained ML parameters" refer to the model's weights, which have been adjusted iteratively during training to minimize a specific loss function. The trained ML parameters are a result of the training process and represent the learned patterns from the training data, allowing the model to make predictions on new, unseen data.

"Datasets" are collections of data used to build ML mathematical model, to make data-driven predictions or decisions. In "supervised learning" (i.e. inferring functions from known input-output examples in the form of labeled training data), three types of ML datasets (also designated as ML sets) are typically dedicated to three respective kinds of tasks: "training", i.e. fitting the parameters, "validation", i.e. tuning ML hyperparameters (which are parameters used to control the learning process), and "testing", i.e. checking independently of a training dataset exploited for building a mathematical model that the latter model provides satisfying results.

"Transfer learning" refers to a paradigm where a model is pre-trained on a source task and then fine-tuned on a target task to enhance performance. This may involve utilizing the learned features or representations from the source task and adapting them to the target task. By leveraging shared knowledge, transfer learning addresses challenges posed by limited labeled data in the target task, ultimately improving the model's generalization and effectiveness in diverse applications. The technical intricacies involve optimizing the model's parameters during the fine-tuning stage to align with the nuances of the specific target task while retaining the knowledge gained from the source task.

A "neural network (NN)" designates a category of ML comprising nodes (called "neurons"), and connections between neurons modeled by "weights". For each neuron, an output is given in function of an input or a set of inputs by an "activation function". Neurons are generally organized into multiple "layers", so that neurons of one layer connect only to neurons of the immediately preceding and immediately following layers.

The above ML definitions are compliant with their usual meaning, and can be completed with numerous associated features and properties, and definitions of related numerical objects, well known to a person skilled in the ML field. Additional terms will be defined, specified or commented wherever useful throughout the following description.

The term "foundation model" is a large-scale AI model, (pre) trained on vast amounts of data, designed to perform a wide range of tasks through fine-tuning. These models, such as GPT-4 and BERT, serve as a base for developing specialized applications across various domains by adapting their broad capabilities to specific tasks through additional training.

The term "passive command" in a brain-computer interface (BCI) system refers to a type of instruction or signal that is generated automatically by the user's brain activity without the need for active, conscious effort or specific mental actions. This is in contrast to "active commands", which require the user to consciously perform a task or think in a particular way to generate a signal. Passive commands are typically based on the detection of patterns of neurophysiological activity and the interpretation of ongoing brain activity, such as detecting changes in emotional state, attention level, or other cognitive states that occur naturally during various mental processes. They can be used in BCI systems to enhance user experience by allowing the system to adapt to the user's mental state or to provide a more intuitive and seamless interaction. For example, a BCI system might adjust the difficulty level of a game based on the user's level of engagement or change the environment in a virtual reality setting based on the user's emotional state.

The term "active command" in a brain-computer interface (BCI) system refers to a type of instruction or signal that is intentionally and consciously generated by the user through specific mental activities or thought processes. Unlike passive commands, which are based on naturally occurring brain activity, active commands require the user to engage in a deliberate mental task, such as imagining a movement, focusing on a particular thought, or performing a cognitive exercise. These specific mental actions produce distinguishable patterns of brain activity that the BCI system can detect and interpret as commands. Active commands are central to many BCI applications, particularly those that enable users to control external devices or interfaces. For example, in a BCI-controlled prosthetic limb, the user might think about moving their hand, and the system translates this brain activity into actual movements of the prosthetic.

"AI agents" in the context of human machine interactions are software programs designed to autonomously interact with human users by perceiving changes in their various environments, processing data from sensors, and performing tasks to achieve specific goals. They can operate independently or in collaboration with human operators and/or other AI agents to enhance decision-making, provide real-time support, and continuously improve through learning from interactions. In the present invention, the BCI functions (i.e., generation of passive commands and active commands) thanks to cognitive AI agents (or cognitive classifier) that can detect cognitive and affective states, and a command AI agent (active command classifier), and a supervisor AI agent, being the output of the probability accumulator.

The term "real-time" refers to the processing, analysis or displaying of data or information as it is generated or received, immediately as it occurs, without significant delay. In the context of the present invention real-time processing means that tasks are completed within a guaranteed and deterministic time frame, ensuring that the device/apparatus can respond to received physiological signals in a timely manner.

"Subjects' signals" refers to multimodal data previously recorded, processed and stored used to train the models of the present invention. "User signal" refers to data collected in real time thanks to the present invention that is being processed, augmented and stored.

A "floating time window" (also referred to as a sliding window or moving window) is a finite-duration segment that traverses a signal sequentially over time, typically with a fixed step size. At each position, the time window enables localized analysis of the signal's characteristics, such as (but not limited to) amplitude, frequency content, or statistical properties, within the time frame it covers.

BRIEF DESCRIPTION OF THE DRAWINGS

The present disclosure will be better understood, and other specific features and advantages will emerge upon reading the following description of particular and non-restrictive illustrative embodiments, the description making reference to the annexed drawings wherein.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein may represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

Figure 1:
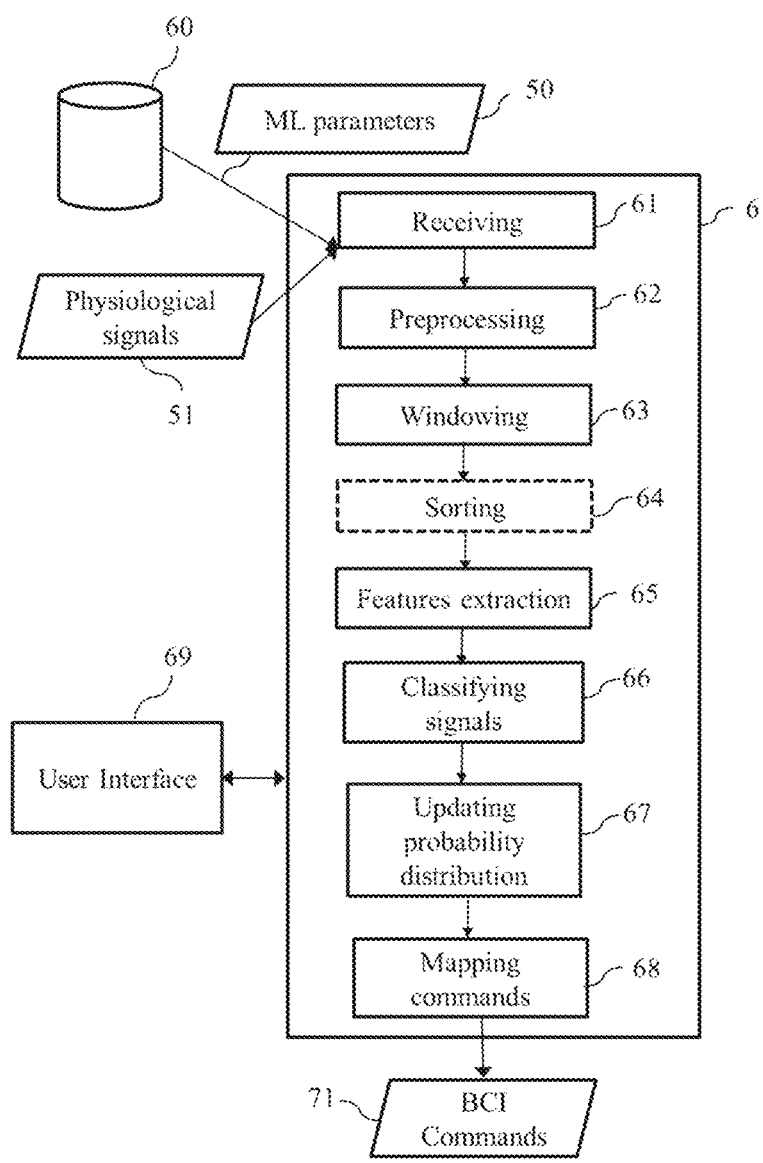
FIG. 1 is a block diagram representing schematically a particular mode of a system which associates multimodal physiological signals from a user with commands of a brain-computer interface, compliant with the present disclosure.

The present disclosure will be described in reference to a particular functional embodiment of a device 6 for controlling a brain-computer interface (BCI), as illustrated on FIG. 1.

The device 1 is adapted to associate multimodal physiological signals from a user 51 with the command(s) of a brain-computer interface (BCI), using a trained user-specific machine learning system.

Figure 3:
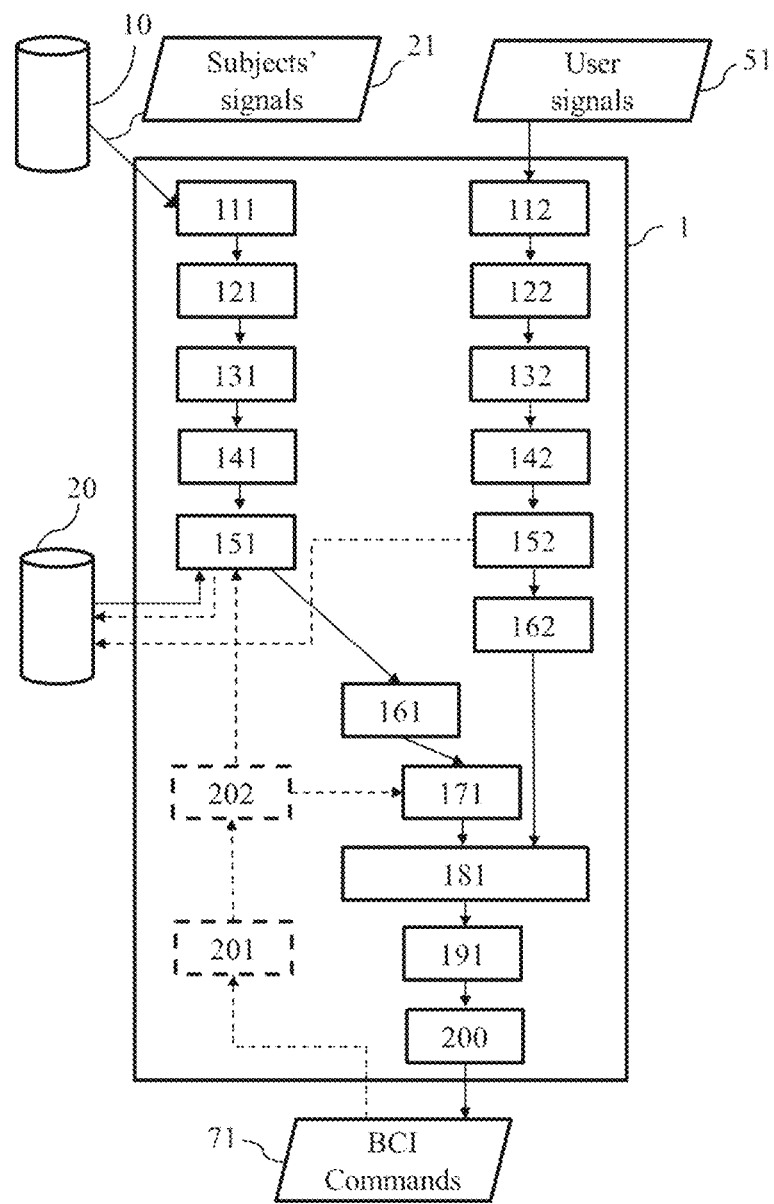
FIG. 3 is a block diagram representing schematically a particular mode of a device for ML training, compliant with the present disclosure and adapted to the device for predicting of FIG. 1.
Figure 4:
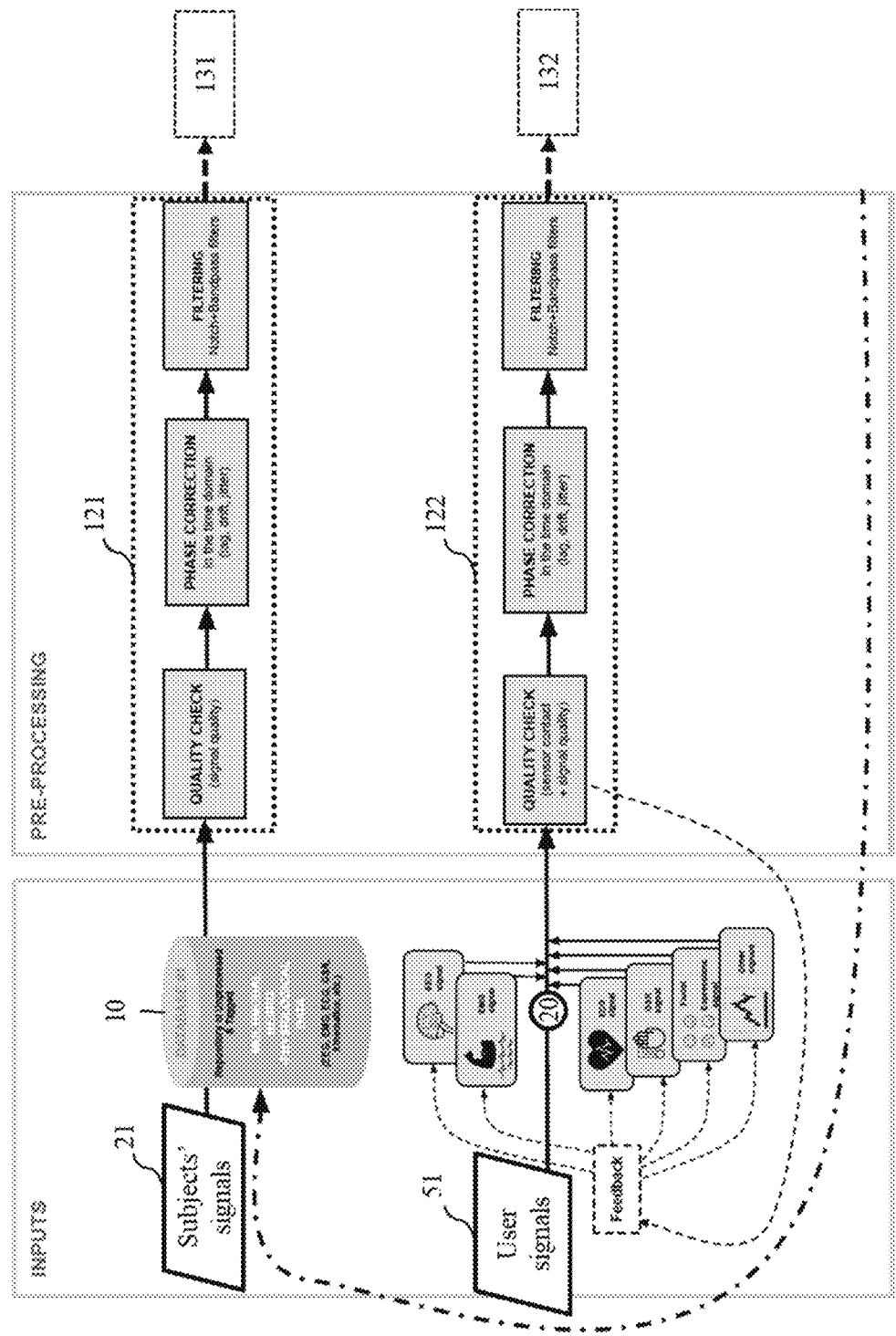
FIG. 4 is a block diagram representing schematically a particular embodiment of the inputs and pre-processing stage of a device for ML training, compliant with the present disclosure and adapted to the device for predicting of FIG. 1.
Figure 5:
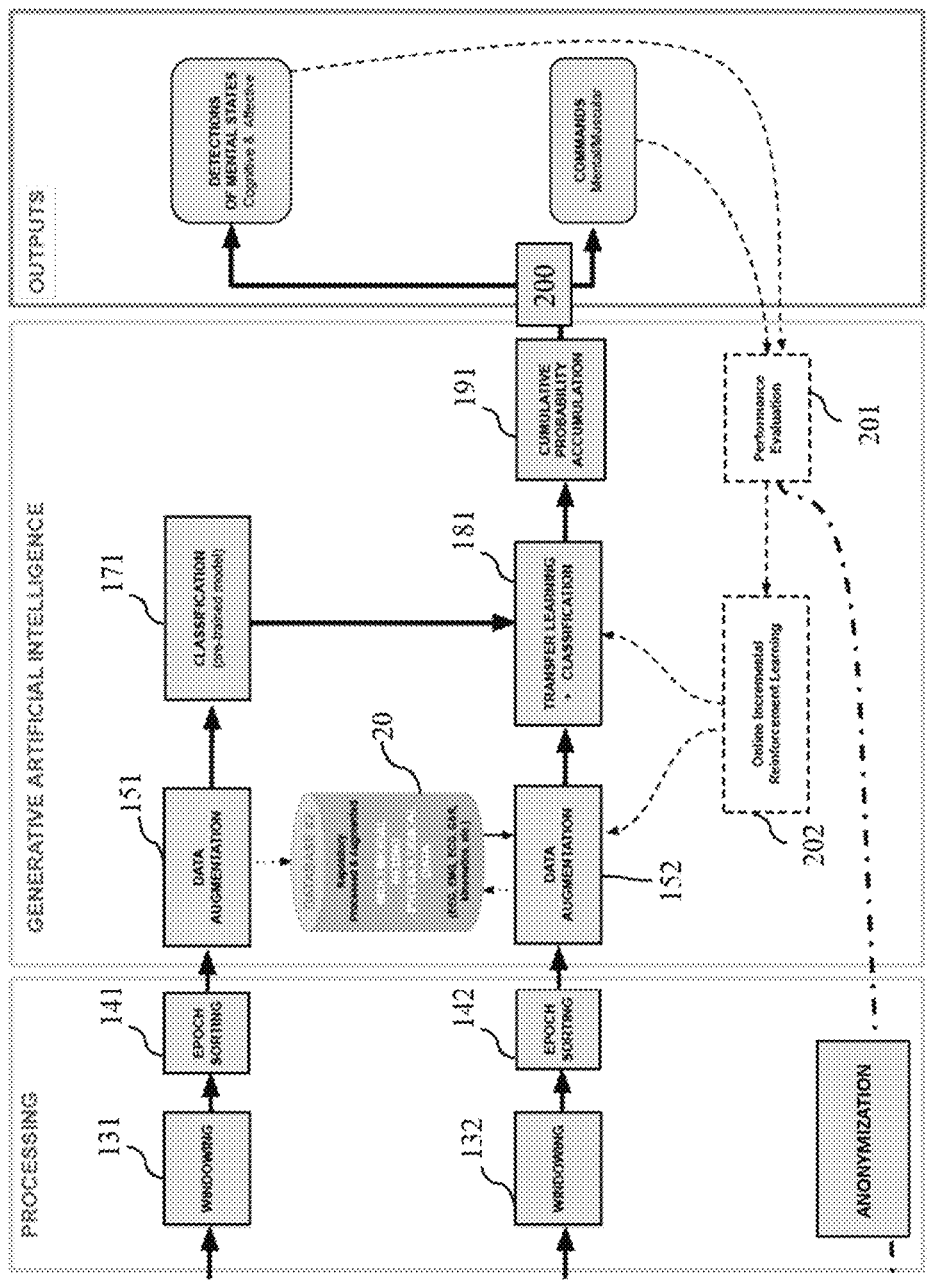
FIG. 5 is a block diagram representing schematically a particular embodiment of the processing stage, generative artificial intelligence stage and outputs of a device for ML training, compliant with the present disclosure and adapted to the device for predicting of FIG. 1.

The device 6 for controlling is associated with a device 1 for training suited to setting model's parameters of the device 6 in a proper way, as represented in FIGS. 3, 4 and 5, which will be subsequently described.

Though the presently described devices 1 and 6 are versatile and provided with several functions that can be carried out alternatively or in any cumulative way, other implementations within the scope of the present disclosure include devices having only parts of the present functionalities.

Each of the devices 1 and 6 is advantageously an apparatus, or a physical part of an apparatus, designed, configured and/or adapted for performing the mentioned functions and producing the mentioned effects or results. In alternative implementations, any of the device 1 and the device 6 is embodied as a set of apparatus or physical parts of apparatus, whether grouped in a same machine or in different, possibly remote, machines. The device 1 and/or the device 6 may e.g. have functions distributed over a cloud infrastructure and be available to users as a cloud-based, or have remote functions accessible through an API.

In what follows, the modules are to be understood as functional entities rather than material, physically distinct, components. They can consequently be embodied either as grouped together in a same tangible and concrete component or distributed into several such components. Also, each of those modules is possibly itself shared between at least two physical components. In addition, the modules are implemented in hardware, software, firmware, or any mixed form thereof as well. They are preferably embodied within at least one processor of the device 1 or of the device 6.

It is to be notice that the modules of the device 6 are configured to operate so that the analysis of the received physiological signals 51 are being processed in real-time.

The device 6 comprises a module 61 for receiving at least one set of physiological signals acquired from said user 51, as well as trained ML (machine learning) parameters 50 stored in one or more local or remote database(s) 60. The latter can take the form of storage resources available from any kind of appropriate storage means, which can be notably a RAM or an EEPROM (Electrically-Erasable Programmable Read-Only Memory) such as a Flash memory, possibly within an SSD (Solid-State Disk) or DNA-based storage systems. In advantageous embodiments, the trained ML parameters 50 have been previously generated by a system including the device 6 for training. Alternatively, trained ML parameters 50 are received from a communication network.

In one embodiment, each set of physiological signals comprises at least two physiological signals which have been measured by at least two distinct sensors. One of the at least two physiological signals 51 is a neurophysiological signal acquired from at least two electrodes of an electroencephalograph from the user (i.e., EEG signals). The at least one other physiological signal (i.e., not neurophysiological) may be one of the following (but not restricted to): electrocardiogram (ECG or EKG), electromyogram (EMG), electrooculogram (EOG), electrodermal Activity (EDA), electrooculogram (EOG), electrodermal Activity (EDA), Blood Pressure (BP), heart rate, respiration rate, pulse oximetry (SpO2), temperature, blood glucose level (CGM), capnography, Body Mass Index (BMI), photoplethysmography (PPG), body composition, spirometry, Intracranial Pressure (ICP), plethysmography, and hydrostatic pressure, motion signal acquired from an inertial sensor (i.e., accelerometer, gyroscope, magnetometer). Physiological signals 51 may be acquired by any sensor known by the person skilled in the art to collect the specific type of signal. The sensors may be able to collect the physiological signals online so that sensors continuously and in real-time monitor physiological signals. Physiological signals 51 is received and processed in real-time, allowing for immediate analysis and feedback from device 6. This approach is particularly advantageous in the case of the present invention of real-time control of a BCI interface.

The device 6 comprises a module 62 for pre-processing the received (multimodal) physiological signals 51, notably on-line (i.e., in real time). The module 62 may comprise different sub-modules (621, 622 not shown in FIG. 2) for applying different operations on the received physiological signals 51. Among the operations performed, module 62 comprises means to evaluate quality of incoming signals. Indeed, ensuring that multimodal sensors have good contact/positioning quality is essential to obtain accurate and reliable multimodal signals, which is fundamental to ensure the quality of the signal, to advantageously increase the spatial and temporal resolution, and reduce inter- and intra-user variability.

Module 62 may comprise a sub-module 621 for electrode impedance check. Impedance is a measure of the resistance to electrical current flow through an electrode-skin interface, such as in the case of EEG, EMG, ECG and the like. A lower impedance value indicates that the electrode is making good contact with the scalp, while a higher impedance value indicates poor contact quality. To measure the impedance of an electrode, a small alternating current is passed through the electrode and the resulting voltage is measured. The ratio of voltage to current is the impedance of the electrode. Typically, an impedance value of less than approximately 5 kOhms is considered to be good contact quality, while values above approximately 5 kOhms are considered to be poor contact. Therefore, in one example sub-module 621 may be configured to compare neurophysiological/physiological signal(s) to a predefined threshold that may have a value comprised between approximately 4.0 kOhms and approximately 7.0 kOhms (i.e., quality criterion). Any other methods for impedance check known by the person skilled in the art may be implemented by sub-module 621.

Module 62 may comprise a sub-module 622 for evaluating the reference electrode of the EEG system acquiring the neurophysiological signal(s) received. A reference electrode is an electrode used to measure the average electrical potential of a particular point in the brain. It is used to adjust the electrical potentials of all the other electrodes. A typical reference electrode is a reference electrode placed on the head of the user, such as the earlobe, the nose or the mastoids. The reference electrode is used to measure the electrical potentials of all the other electrodes and to compare their respective potentials. This sub-module is configured to compare the potentials of acquisition electrodes and the reference electrode, to advantageously assess whether there is a big variation in signal quality across various electrodes, which may indicate, for example, poor contact quality of the sensors. By measuring the impedance of each electrode, and comparing it to the reference electrode, it is advantageously possible to identify electrodes that have poor contact quality.

The information on the quality of incoming physiological signal(s) may be provided to the user so that the user may reposition them or replace them to improve the local and overall quality of the EEG signal. For this function, module 62 may further comprise a sub-module 623, configured to transmit to a user interface 69 the obtained quality information allowing to prompt said user to adjust said at least two distinct sensors if a quality criterion is not met by said computed quality check submodule 621 and 622.

Module 62 may comprise a sub-module 624 for phase correction in the time domain of the neurological and physiological signal. Phase correction in the time domain refers to the process of adjusting the phase of a signal so that it aligns with a reference signal. This can be done by introducing a phase shift to the signal, which can be achieved by multiplying the signal by a complex exponential function. The amount of phase shift applied is typically based on the difference in phase between the signal and the reference signal. The corrections that may be performed are at least one of the following: lag, drift, phase jitter and the like.

In the context of neurophysiological data, lag can occur due to various factors such as electrode movement, changes in skin impedance, and muscle activity. These factors can lead to a delay in the neurophysiological signal, which can make it difficult to accurately analyze the data. The delay between the reference signal and the signal is corrected. If the signal being corrected lags behind the reference signal, a positive phase shift must be applied to align the two signals. Conversely, if the signal being corrected leads to the reference signal, a negative phase shift must be applied. The amount of lag is typically measured in time units, such as seconds or samples, and the phase shift applied is proportional to this lag. This technique is particularly adapted to correct for time-varying phase differences that can occur in neurophysiological data analysis, such as in studies of brain dynamics and neurophysiological-based brain-computer interfaces.

The term drift refers to a gradual change in the phase difference between a signal and a reference signal over time. Drift can occur due to various factors such as temperature changes, the aging of equipment, and other external factors. Drift can cause a signal to become misaligned with the reference signal over time, resulting in degraded performance of the system. In the context of neurophysiological signals, drift can also occur due to changes in the subject's body position, changes in skin impedance, and other physiological factors. To correct phase drift in neurophysiological signals, phase correction algorithms continuously monitor the phase difference between the signal and reference signal and apply phase shifts as necessary to keep them aligned. This can be done using phase-locked loops (PLLs) or other types of phase correction algorithms (Digital Signal Processing algorithms (DSP), Kalman filter, or Butterworth filter for example), or by performing a linear regression on two sets of time data: "local" and "device" timestamps in order to find a linear relationship between the two sets of data, which can be used to correct for drift in the timestamps. Drift compensation advantageously allows to rely on precise timing and phase alignment of neurophysiological signals. In addition, drift correction advantageously allows to maintain the phase alignment of the signal over a prolonged period.

The term "phase jitter" refers to a random variation in the phase difference between a signal and a reference signal over time. Phase jitter can occur due to various sources such as noise, interference, and other types of signal degradation. Phase jitter can cause a signal to become misaligned with the reference signal, resulting in degraded performance of the system. In the context of neurophysiological data, phase jitter can be caused by various factors such as electrode movement, changes in skin impedance, and muscle activity. These factors can lead to random fluctuations in the phase of the neurophysiological signal, which can make data analysis difficult. To correct for phase jitter in neurophysiological signal(s), phase correction algorithms typically use some form of averaging or filtering to smooth out the jitter and reduce its effects. This can be done using phase-locked loops (PLLs) or other types of phase correction algorithms (Digital Signal Processing algorithms (DSP), Kalman filter) or by using interpolation techniques to fill in missing data points caused by jitter (linear, polynomial or spline interpolation to estimate missing data points and make sure that the signal is continuous), resampling techniques by adjusting the signal's sampling rate to match the desired rate and smoothing techniques by applying a low-pass filter to remove high-frequency noise and reduce phase jitter. Phase jitter compensation is important in many applications including neurophysiological-based brain-computer interfaces, sleep analysis, and other systems that rely on precise timing and phase alignment of neurophysiological signals.

Module 62 may comprise a sub-module 625 for filtering. This sub-module may be configured to apply a notch filter to the neurophysiological signals to remove specific frequency components. A notch filter may be applied on neurophysiological signals to remove power line interference (PLI) at 50 or 60 Hz. In some cases, a notch filter could be applied at 100 Hz or 120 Hz, to remove the frequency harmonics associated with electric current, in addition to the main frequency at 50 or 60 Hz. This type of noise is introduced by the electrical power supply and can greatly affect the neurophysiological signal, making it difficult to analyze. Notch filtering is a type of band-stop filter that is designed to reject a narrow frequency band while passing all other frequencies. It is a two-step process that involves first identifying the frequency of the noise (50 or 60 Hz) and then applying a filter that rejects that specific frequency. This sub-module may use notch filtering in conjunction with other types of filtering such as low-pass and high-pass filtering to further improve the quality of the neurophysiological data. The quality of the neurophysiological data after applying notch filtering is advantageously improved, as it helps to eliminate noise and artifacts that can be present in the raw data, making it easier to extract meaningful information from the signal.

This sub-module may be configured to apply in addition or as alternative a bandpass filtering to isolate specific frequency bands of interest in the neurophysiological signals, to advantageously remove noise and unwanted frequency components that may be present in the signal, and to enhance the visibility of certain neural activity. Different types of bandpass filters may be applied for bandpass filtering, such as Butterworth, Chebyshev, elliptic filters finite, impulse response (FIR) or infinite impulse response (IIR) filter, and any other bandpass filter known by the person skilled in the art. Advantageously applying bandpass filtering on (neuro) physiological signals allows to isolate specific frequency bands of interest, and it is used to remove noise and unwanted frequency components that may be present in the signal, and to enhance the visibility of certain neural activity.

Sub-module 625 for filtering may comprise any other signal filtering methods used for every other electrophysiological signal.

The module 62 may further comprise a submodule 626 for pre-processing artifact removal. Artifacts are unwanted signals present in the neurophysiological data that can be caused by various sources, such as eye blinks, muscle movements, and electrical noise. These artifacts can greatly affect the quality of the (neuro) physiological signal and make it difficult to classify the signals correctly. Correcting artifacts is crucial to improve the quality of the (neuro) physiological signal, making it more accurate, reliable, and useful for analysis and interpretation, which is crucial for the classification of (neuro) physiological signals.

Submodule 626 may be configured to implement on the neurophysiological signals (i.e., EEG) a Riemannian Artifact Subspace Reconstruction (rASR) method, which is a method for handling artifacts in electroencephalography (EEG) data. One of the notable strengths of rASR lies in its effectiveness across a wide range of artifacts found in EEG data. It is adept at handling spatial and temporal artifacts, advantageously allowing it to obtain clean and reliable EEG signals. rASR uses mathematical techniques from Riemannian geometry to estimate the subspace of the EEG data that is likely to contain artifacts. Once this subspace is estimated, rASR then uses this information to reconstruct the EEG signals, removing the artifactual components. rASR is advantageously effective in removing a wide range of artifacts from EEG data. Submodule 626 may be further configured to implement other artifact correction methods used for every other electrophysiological signal.

It may be observed that the operations by the sub-modules of module 62 are not necessarily successive in time, and may overlap, proceed in parallel or alternate, in any appropriate manner.

The device 6 comprises a module 63 for windowing configured to divide each received physiological signal into at least one floating time window, each floating time window being associated to an event of interest in said received physiological signal. Each floating time window typically represents a specific period, such as a few seconds or minutes, and is defined by a start and end time relative to some event or stimulus. The duration of the floating time windows is adjusted according to the type of physiological signal received, event present in said signal and commands sent, although the average is around 1.5-2 s for mental commands. As the at least one set of physiological signals 51 acquired from said user comprises a neurophysiological signal and at least one physiological signal of another nature (i.e., non-neurophysiological signal, e.g. non EEG), this step provides floating time windows of the neurophysiological signal and floating time windows for each of the at least one physiological signal of another nature. The floating time windows obtained from the neurophysiological signal and non-neurophysiological signal may be analyzed in subsequent steps using distinct processing methods appropriate to each signal type.

The device 6 may further comprise a module 64 for sorting in order to advantageously reject floating time windows which contain too many artifacts and make the physiological signal classification difficult.

Module 64 is configured to calculate a signal quality index for each floating time window obtained by module 63 and sort said floating time windows based on a signal quality index computation and remove from the generic training data the n floating time windows, n being a predefined natural number, having the lowest signal quality index. Instead of sorting, module 64 may be configured to apply a removal rule to the signal quality index calculated for the floating time windows, such as for example comparing the signal quality index to a predefined threshold and remove the floating time windows that having a signal quality index inferior or superior to said predefined threshold.

For EEG and EMG signals, module 64 may implement a Riemannian technique called Riemannian Potato Field to estimate the signal quality index (SQI) of these physiological signals in an online manner, in order to measure the quality of the signal segments of the floating time windows. The Riemannian Potato Field method uses mathematical techniques from Riemannian geometry to estimate the SQI of the floating time windows. The method is based on the idea that the signal can be modeled as a point on a Riemannian manifold, and that the quality of the signal can be determined by the distance of that point from a reference point on the manifold, which represents a "poor/low" quality signal. The Riemannian Potato Field method advantageously allows to effectively estimate the SQI of EEG or EMG signals in real-time, which is particularly useful for applications of the present invention (i.e., brain-computer interfaces), where it is important to be able to continuously monitor the quality of the EEG signal. Module 64 may be configured to implement other epoch sorting methods to be used for every other electrophysiological signal. For ECG (Electrocardiogram) signals, a common quality index might involve measuring the signal-to-noise ratio (SNR) to evaluate the clarity of heart rate and rhythm detection. In the case of EOG (Electrooculogram) signals, the corneal-retinal potential (CRP) amplitude and stability could be used as a quality index to ensure accurate eye movement tracking. In neurophysiological recordings like MEG (Magnetoencephalography) or fNIRS (functional Near-Infrared Spectroscopy), measures of Signal-to-Artifact Ratios (SAR) and motion artifacts might be employed as quality indices to assess the validity of brain activity measurements.

The device 6 may comprise a data augmentation module configured to perform data augmentation algorithms on the floating time windows derived from the received physiological signals. This module may be configured to perform data augmentation on user data only in case a predefined criterion is satisfied. A testing algorithm may be used to obtain an information representative of the effectiveness and robustness of the updated user-specific model of said trained user-specific machine learning system. This test is implemented before using transfer learning techniques. If the effectiveness and robustness is not satisfying (i.e., predefined criterion is not satisfied), the augmentation of data is performed on the iteratively received set of user physiological signals or on the covariance matrices computed using the iteratively received set of user physiological signals.

The device 6 (for controlling) further comprises a module 65 for features extraction. This module 65 is configured to apply different computational steps to the data derived from subjects' physiological signals acquired from said user 51 depending on their nature (i.e., the sensors from which have been acquired).

In the case of neurophysiological signals, the module 65 is configured to first compute a covariance matrix for each floating time window. A covariance matrix is a square matrix that describes the linear relationship between different neurophysiological channels (i.e., one neurophysiological signal comprises two or more neurophysiological channels). It advantageously contains information about the neurophysiological signals' spatial and temporal properties.

The computed covariance matrices are then projected into a tangent space of subject features representation. Tangent space projection is a technique that maps the covariance matrices onto a lower-dimensional space, where they can be better visualized and analyzed. This step is useful for reducing the dimensionality of the data and capturing the most relevant information for classification. Module 65 then extracts the features associated to the floating time windows from said projections in the tangent space.

Module 65 may as well be configured to compute a coherence matrix, which advantageously allows it to provide features relating to functional connectivity in the brain. The coherence matrices may be as well projected to said tangent space to extract features. Module 65 may as well be configured to extract more features, to optimize the algorithm precision. Various feature extraction techniques, such as coherence matrix analysis, quantification of entropy (e.g., approximate entropy or sample entropy), spectral entropy, and fractal dimension, advantageously can offer deeper insights into the underlying neural dynamics. Coherence, for instance, reveals functional connectivity between different brain regions, shedding light on how they work together during specific tasks. Unlike covariance matrices, coherence matrices are not necessarily semi-positive definite (SPD). These matrices must be preprocessed before being projected to said tangent space to extract features. Entropy measures capture the complexity and irregularity of EEG signals, which can be invaluable for distinguishing between normal and pathological brain states. Spectral entropy, on the other hand, provides information about the distribution of power across different frequency bands, allowing for a more nuanced characterization of brain activity patterns. Fractal dimension quantifies the self-similarity and complexity of EEG signals, which is especially pertinent when assessing the dynamics of pathological conditions.

Furthermore, techniques like wavelet transforms and time-frequency analysis enable the study of transient events and time-varying dynamics, while higher-order statistics and connectivity measures (e.g., phase locking value) provide insights into non-Gaussian properties and functional interactions among EEG channels. Incorporating time-domain features and waveform morphology analysis allows for a more comprehensive understanding of the EEG signal's shape and dynamics. Additionally, neuronal avalanche analysis, based on an avalanche transition matrix (ATM) can provide insights into the spatiotemporal dynamics of neural activity, potentially offering a unique perspective on brain function. Like said coherence matrices, ATM are not necessarily semi-positive definite (SPD). These matrices must be then preprocessed before being projected to said tangent space to extract features. After extracting said features from the data, a feature fusion algorithm combines them into a unified representation. This process is essential to enhance data analysis by integrating information from various sources or methods, leading to more effective and informative data representations. Feature fusion can involve methods like averaging, concatenation, principal component analysis (PCA), decision-level fusion, and neural network-based fusion to combine information from different sources or modalities for enhanced data analysis.

Module 65 may as well be configured to extract features from said floating time windows derived from physiological signals not of neural origin (i.e., physiological signal excluding the neurophysiological signals). For ECG or PPG signals, features like RR intervals and heart rate variability may be extracted for cardiac analysis. In EMG signals, muscle activation patterns and RMS amplitudes may be extracted to help assess muscle function. EOG signals may be analyzed for saccades and blinks to track eye movements. Skin conductance features may be extracted from EDA signals involved for measuring emotional responses.

The device 6 for controlling further comprises a module 66 for classifying the floating time window derived from the received physiological signals. The module 66 is configured to sequentially provide the floating time windows (e.g., provide the floating time windows one by one) as input to an updated user-specific model of said trained user-specific machine learning system. Said updated user-specific model of said trained user-specific machine learning system is the machine learning architecture (described below in the description) that is implemented using the trained ML parameters 50 calculated by the device 1 for training. Once the floating time windows are fed through the updated user-specific model of said trained user-specific machine learning system it is obtained as output a classification of each floating time window into one class, from a plurality of classes. Notably, the output is a vector comprising the probability that the floating time window belongs to each one of the plurality of classes. Each class of said plurality of classes is associated to one executable command (passive or active) of a brain-computer interface 71. In other words, module 66 may be configured to obtain probability distributions corresponding to for a plurality of classes by sequentially inputting (e.g., one after the other, and optionally in time order) said features extracted from said at least one set of physiological signals as input to an updated fine-tuned user-specific model of said trained user-specific machine learning system, the updated fine-tuned user-specific model being configured to classify the features extracted for each floating time window, and obtaining as output a classification of each floating time window (i.e. the features extracted for each floating time window) into one class, from said plurality of classes; each class of said plurality of classes being associated to one executable command of a brain-computer interface 71.

In some embodiments, module 66 may be configured to obtain probability distributions corresponding to a plurality of classes by sequentially inputting (e.g., one after another and optionally in chronological order) features extracted from at least one set of physiological signals into an updated, fine-tuned, user-specific model of the trained user-specific machine learning system, wherein the updated model is configured to classify each feature extracted from a floating time window. The output of the updated model may comprise a classification of each extracted feature into one of the plurality of classes, wherein each class is associated with a respective executable command of brain-computer interface 71.

The device 6 for controlling further comprises a module 67 for updating probability distributions. Physiological signals, and notably neurophysiological signals, have a low Signal-to-Noise ratio, which can make them challenging to classify individual trials. While it is sometimes possible to classify (neuro) physiological data on a single-trial basis, it may not always be the best approach. This is because external factors, such as the user's attention being temporarily diverted, can cause a machine-learning model to misinterpret their intentions. To overcome this problem, the present invention proposes to accumulate confidence over several floating time windows. This approach also offers the benefit of balancing the calibration phase and prediction time, which can lead to the development of an adaptive BCI that improves over time as it is used more frequently (this point will be developed below in the description of the training device). The module 67 is configured to provide as input to an early stopping algorithm of said trained user-specific machine learning system at least two classes obtained from at least two time-successive floating time windows, so to obtain as output an updated probability distribution for said plurality of classes associated to the latest floating time window obtained from the iteratively received user set of physiological signals.

In one example, the early stopping algorithm used in module 67 is a Bayesian accumulation of probabilities. In particular, the module 67 may use a Bayesian accumulation of Riemannian probabilities, which involves updating probability estimates as new data (i.e., physiological signals) become available. This method involves the continual refinement of probability estimates as new data, in the form of physiological signals, becomes available for analysis. It is a parametric method that makes assumptions about the underlying probability distribution. The Bayesian cumulative probability calculation is based on Bayes' theorem, which states that the probability of an event, given some observed data, is proportional to the probability of the data given the event. This method represents these probabilities using Riemannian manifolds, which are mathematical spaces that can be used to model the geometry of probability distributions. In the context of the present invention, Bayesian cumulative probability calculation can be used to estimate the probability of inputted physiological signal segments (i.e., floating time windows) belongs to a certain class, considering the prior knowledge about the class and the distribution of the data (i.e., floating time windows).

Module 67 is further configured to cumulate said probability distributions of said plurality of classes for each floating time window to a buffer.

The device 6 for controlling further comprises a module 68 for mapping the cumulative probability distributions to BCI commands. Module 68 is configured to access these cumulative probability distributions in the buffer and continuously evaluate if a predefined level of confidence is reached for the cumulative probability in said buffer for the different classes. The predefined level of confidence may be defined as a ratio between the probabilities associated to the two most probable classes.

Module 68 is further configured to select at least one executable command 71 associated to the class that has reached said predefined level of confidence. Module 68 may have access to a predefined list of association between the output classes and executable commands, so that at least one class is associated to at least one executable command. In a preferred example, one class is associated with one executable command.

To avoid emitting multiple executable commands for the same floating time window(s), a recovery period is applied after each selection of at least one executable command 71, during which incoming floating time windows are ignored. Said recovery period may range between 10 ms and 20 ms.

Figure 6:
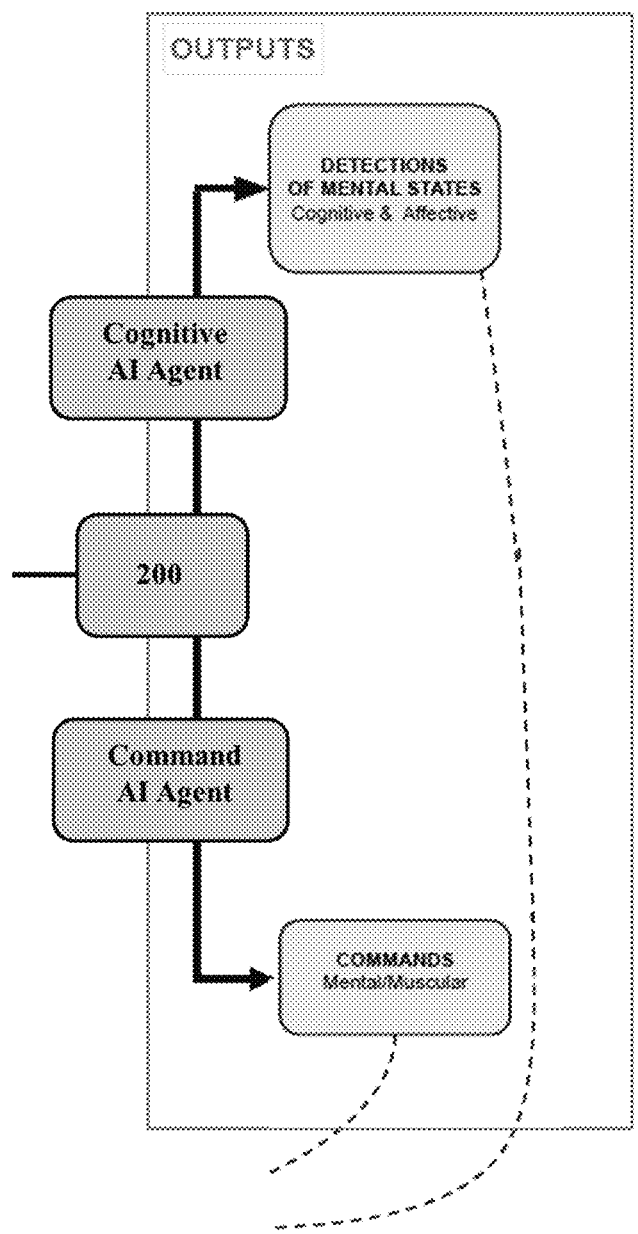
FIG. 6 is a block diagram representing schematically a particular embodiment of the output wherein both the cognitive AI agent and command AI agent are represented.

The executable commands may be active commands associated to a voluntary action that said user would like to execute or to a passive command (i.e., passive cognitive detection). Active commands may be for example a control command, to be transferred to an external device, and being configured so that when the external device receives the active command. For example, it executes one of the following actions: turn on or off said external device, unlock/lock said external device, turn on/off music broadcasted by said external device, scroll a document displayed on said external device (i.e., tablet, computer screen, cell phone and the like), skip a track on a playlist diffused by said external device etc. In other words, active commands are handled by the active command AI agent, which sends the classification results to the supervisor agent, based on cumulative probability distributions. The supervisor AI Agent takes a decision, based on the classifications accumulated in the buffer (FIG. 6).

On the other hand, the so-called passive commands are associated with a mental state of said user such as state of an increased stress level, or of a lower attention level. Passive commands may be a series of responses or actions initiated by the device without the need for deliberate cognitive input from the user. It occurs when the device independently recognizes certain conditions or states, such as elevated user stress levels exceeding a predefined threshold, and automatically provides the user with relevant feedback or instructions to alleviate the situation. In essence, passive commands are triggered by the device's awareness of specific user circumstances, leading to proactive, user-centered interventions without explicit user commands. A "passive" command may be a predefined control command that will be transferred to be executed by an external device without active will of the user. In one example, a passive command associated with a stress state may be configured to turn on relaxing music, intensity of light in the environment of the user is reduced and a calming visual display is activated. This type of passive command is particularly useful in applications where the system is designed to respond automatically to the user's physiological or emotional state. For instance, in a therapeutic setting for individuals with anxiety or stress disorders, the system might detect elevated stress markers (such as increased heart rate, changes in skin conductance, or specific brainwave patterns) and respond by initiating a calming intervention. In other words, passive commands are handled by the cognitive AI agent, which sends the classification results to the supervisor agent, based on cumulative probability distributions. The supervisor AI Agent takes a decision, based on the classifications accumulated in the buffer (FIG. 6).

The device 6 is interacting with a user interface 69, via which information can be entered and retrieved by a user. The user interface 69 includes any means appropriate for entering or retrieving data, information or instructions, notably visual, tactile and/or audio capacities that can encompass any or several of the following means as well known by a person skilled in the art: a screen, a keyboard, a trackball, a touchpad, a touchscreen, a loudspeaker, a voice recognition system.

Figure 2:
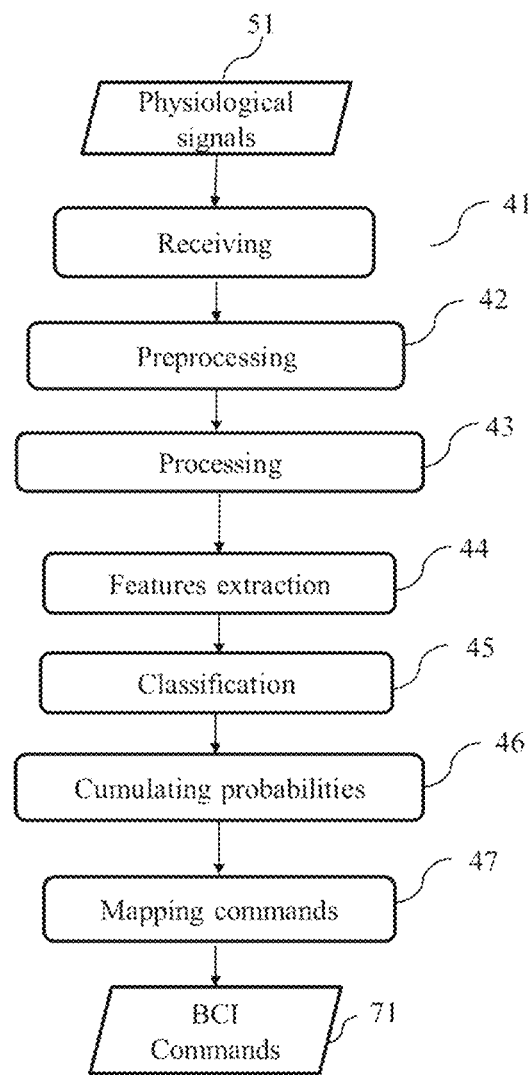
FIG. 2 is a flow chart showing successive steps executed with the device for predicting commands of a brain-computer interface of FIG. 1.

In its automatic actions, the device 6 may for example execute the following process (FIG. 2):
  receiving the physiological signals 51 (step 41 in FIG. 2),
  preprocessing the physiological signals 51 with a view to more efficient and/or reliable processing (step 42 in FIG. 2),
  processing the pre-processed physiological signals 51 to, optionally remove further artifact, segment the signals into floating time windows, and optionally sorting said floating time windows (step 43 in FIG. 2),
  extracting the features from the floating time windows (step 44 in FIG. 2),
  classifying floating time windows into predefined classes using the updated user-specific model of said trained user-specific machine learning system (step 45 in FIG. 2),
  cumulating said probability distributions of said plurality of classes for each floating time window to a buffer (step 46 in FIG. 2),
  mapping classification results to executable commands 71 (step 47 in FIG. 2).

More information will be given hereinafter on the device 1 for training said user-specific machine learning system configured to associate physiological signals. The device 1 may be incorporated in a same apparatus as the device 6 for predicting executable commands and share most functionalities of the device 6. More generally, the device 1 and the device 6 may have common processors configured for executing part of the functionalities of device 1, whether localized or distributed. In alternative implementations, the device 1 and the device 6 may be completely disconnected, and possibly exploited by distinct users.

In advantageous embodiments, the device 6 shares a same architecture with the device 1, as well as a same data preprocessing sequence. For example, the pre-processing and the processing of some physiological signals are identical. This is however not necessary, and the device 1 may have a different architecture to some extent, insofar as it is able to provide model parameters suited to proper predictions by the device 6.

Also, the trained ML parameters 50 exploited by the device 6 may originate from other sources than the device 1.

As represented on FIG. 3, the device 1 is adapted to retrieve initial training parameters defining an initial algorithmic model within the frame of an ML architecture, from one or more local or remote database(s) 10. The latter can take the form of storage resources available from any kind of appropriate storage means, which can be notably a cloud storage RAM or an EEPROM such as a Flash memory, possibly within an SSD. In advantageous embodiments, the initial training parameters have been previously generated by the device 6 for training. Alternatively, the initial training parameters are received from a communication network.

The device 1 is configured for deriving modified training parameters 50 defining a current user-specific machine learning system on the ground of the entry training parameters, and for transmitting those parameters 50 or recording them, e.g. in the database(s) 60. The architecture of the user-specific machine learning system comprises a classification model, an early stopping algorithm and mapping rules. In the present invention, the classification model is a machine learning model designed to classify input data points into predefined categories or classes based on their features or attributes. Notably, the stopping algorithm is configured to receive as input the outputs of at least two successive classification predictions of the classification model and use this information to stop the cumulation of classification outputs when a predefined confidence level is reached for one of the classes of the classification model. Finally, the class who reached the predefined confidence level is mapped to an executable command for the BCI using such mapping rules.

Once the machine learning system is trained for a specific-user, it comprises a fine-tuned user-specific model, an optimized early stopping algorithm and mapping rules configured to associate the classifier outputs over a time window to one executable command for said brain-computer interface. The training of the model and the optimization of the stopping algorithm will be described in detail here below.

The device 1 for training comprises a module 111 for receiving, configured to access a database 10 comprising sets of physiological signals 21 acquired from a plurality of subjects. The device 1 for training also comprises a module 112 for receiving at least one set of physiological signals acquired from said user 51.

Each set of subjects' physiological signals 21 (i.e., stored in said database 10) and each set of subjects' physiological signals 51 comprises at least two physiological signals being acquired by at least two distinct sensors. One of the at least two physiological signals is a neurophysiological signal acquired from at least one or at least two electrode(s) of an electroencephalograph on one individual of said plurality of subjects. The at least one other physiological signal (i.e., not neurophysiological) may be one of the following (but not restricted to): electrocardiogram (ECG or EKG), electromyogram (EMG), electrooculogram (EOG), electrodermal Activity (EDA) electrooculogram (EOG), electrodermal Activity (EDA), Blood Pressure (BP), respiration rate, pulse oximetry (SpO2), temperature, blood glucose level, galvanic skin response (GSR), capnography, Body Mass Index (BMI), Heart Rate Variability (HRV), body composition, spirometry, Intracranial Pressure (ICP), plethysmography, and hydrostatic pressure. The physiological signals (51, 21) may be acquired by any sensor known by the person skilled in the art to collect the specific type of signal.

Said subjects' physiological signals of said sets of subjects' physiological signals 21 may be associated to labels associated to the predefined classes of the generic classification model, one executable command for a BCI or a subject mental state. In this context, the subjects' physiological signals are also segments of physiological signals (i.e., floating time windows). Said labels may have been associated to one subject physiological signals by a human or by an algorithm.

Device 1 for training may further comprise a module 121 for pre-processing the set of subjects' physiological signals 21 of the database 10, notably off-line and a module 122 for pre-processing the set of user's physiological signals 51, notably on-line. FIGS. 3 and 4 provide an illustration of modules 121 and 122, and their function in the device 1. Said module 121 and 122 for pre-processing may be configured to perform the same pre-processing operations on the physiological data than module 62 for pre-processing. Optionally, device 1 may use the module 62 for pre-processing of device 6 and vice-versa.

Device 1 for training may further comprise a module 131 for windowing the pre-processed physiological signals 21, notably off-line and a module 132 for windowing the pre-processed user's physiological signals 51, notably on-line. FIGS. 3 and 5 provide an illustration of modules 131 and 132, and their function in the device 1. The operations implemented for dividing the signals by modules 131 and 132 may be identical to the ones implemented by the module 63 for windowing of device 6.

Device 1 for training may further comprise a module 141 for sorting the windowed subjects' physiological signals 21, notably off-line and a module 142 for sorting the windowed user's physiological signals 51, notably on-line. FIGS. 3 and 5 provide an illustration of modules 141 and 142, and their function in the device 1. The operations implemented for sorting the signals by modules 141 and 142 may be identical to the ones implemented by the module 64 for windowing of device 6.

Device 1 for training further comprises a module 151 for data augmentation the pre-process and processed subjects' physiological signals 21, notably off-line, and a module 152 for data augmentation the pre-process and processed user's physiological signals 51, notably on-line. FIGS. 3 and 5 provide an illustration of modules 151 and 152, and their function in the device 1. Advantageously, using data augmentation allows to increase the amount of data available for training algorithms, which is crucial for the analysis and interpretation of brain signals such as neurophysiological. The goal of Data Augmentation is to create more diverse and realistic examples of the same data, which can improve the generalization performance of the algorithms, and make them more robust and less sensitive to noise, artifacts, variations in recording conditions, different users, and tasks, and the dynamic nature of brain signals. By increasing the amount of data available for training, Data Augmentation can help to reduce the risk of overfitting, which occurs when the model becomes too specialized to the training data and performs poorly on new data. Data Augmentation can also be used to handle the high-dimensionality and non-linearity of brain signals, by creating new examples of the data that reflect these characteristics. Additionally, Data Augmentation can help to make the model more robust to noise and artifacts, variations in recording conditions, users, and tasks, and to handle the dynamic nature of brain signals, by creating new examples that reflect these variations and dynamics.

Modules 151 and 152 are configured to implement data augmentation techniques on the floating time windows in order artificially increase the size of the generic training dataset stored in the database 10, by creating augmented floating time windows (i.e., new samples) based on the existing data, and the user data respectively. FIGS. 3 and 5 provide an illustration of modules 151 and 152, and their function in the device 1. This data augmentation may be implemented by applying various types of transformations to the original floating time windows, such as rotation, scaling, translation, and flipping. These transformations can be applied to the spatial, temporal or spectral dimension of the floating time windows. Multiple algorithms may be used such as SignFlip algorithm, wherein the sign axis is flipped for each input with a given probability or Gaussian Noise algorithm, wherein white noise is randomly added to the floating time windows. The data augmentation may be based as well on artificial intelligence (e.g., Generative Adversarial Networks, Variational Autoencoders or Diffusion Model). The augmented data may be stored in a second database 20.

Optionally, device 1 may use the modules 61, 62, 63 and 64 of device 6 to pre-process and process the user's data, instead of comprising modules 112, 132, 142 and 152 and vice-versa.

Device 1 for training further comprises a module 161 for feature extraction the pre-processed and processed subjects' physiological signals 21, notably off-line, and a module 162 for feature extraction the pre-process and processed user's physiological signals 51, notably on-line. FIG. 3 provides an illustration of modules 161 and 162, and their function in the device 1. The operations implemented for feature extraction by modules 161 and 162 may be identical to the ones implemented by the module 65 for feature extraction of device 6. In other words, module 161 is configured to extract features from floating time windows derived from dividing said neurophysiological signals of said sets of subjects' physiological signals 21 from the plurality of subjects (e.g., computing a covariance matrix for each floating time window obtained from said neurophysiological signals, projecting said covariance matrix into a tangent space of features representation and extracting said features from said projection in the tangent space) and extracting features from said floating time windows derived from dividing said physiological signals, excluding the neurophysiological signals, from the plurality of subjects. On the other hand, module 162 is configured to extract features from floating time windows derived from dividing said neurophysiological signal of the at least one set of physiological signals acquired from the user 51 (e.g., computing a covariance matrix for each floating time window obtained from the user neurophysiological signal, projecting said covariance matrix into a tangent space of features representation and extracting said features from said projection in the tangent space) and extracting features from said floating time windows derived from dividing said physiological signals from the user (excluding the neurophysiological signals). Module 161 is also configured to obtain a generic training dataset using the features extracted from the pre-processed (i.e., by module 121, 131 and 141) and processed (i.e., by module 151 and 161 itself) sets of physiological signals acquired from a plurality of subjects (from database 10). The generic training dataset comprises a plurality of training samples. Each training sample may comprise the features extracted from the floating time windows derived from one set of physiological signals, associated with one subject of the plurality of subjects. In other words, each training sample may comprise features extracted from floating time windows derived from neurophysiological signals and features extracted from floating time windows derived from physiological signals other than the neurophysiological signal. In this way, one training sample comprises features relating to one subject and a delimited period. Notably, each training sample may be associated with at least one label. Said label may be one active command associated with the device 6 or a mental state of the subject, or any other information related to the neural and physiological signals from which the training sample features have been extracted.

Device 1 comprises a training module 171 configured to (additionally) train a generic classification model using said generic training dataset. FIGS. 3 and 5 provide an illustration of module 171, and its function in the device 1. The training module 171 may be used only once or only when the database 10 has been updated of a predefined quantity of new data. The generic classification model may be a previously trained foundation model, and therefore the module 171 is configured to additionally train it on a more specific training dataset.

The pre-training module 171 may be configured to train said generic classification model by feeding forward the training samples comprised in the generic training dataset in said generic classification model so to obtain a trained generic classification model configured to associate an input sample (i.e., representative of a set of physiological signals) to one or more predefined categories or classes based on their features or characteristics. In one preferred example, the output can be a probability score or a probability distribution over the different classes. The trained generic classification model is configured to receive an input sample comprising features extracted from at least one set of physiological signals, being measured by at least two distinct sensors, wherein one of the at least two physiological signals is a neurophysiological signal. In one example, the input sample further comprises raw signal(s) (i.e., at least one of the physiological signals in the set(s) of physiological signals). In one alternative embodiment, said input sample may only comprise raw signal(s) (i.e., no features). The classes of said trained generic classification model are each associated to one executable command of a brain-computer interface. The architecture of the generic classification model may be chosen among logistic regression, support vector machines with probability estimates, Random Forest, and many types of neural networks (such as CNN, RNN, and Transformers), optionally those with softmax activation in the output layer. The generic classification model may be trained in a weakly or fully supervised manner.

Therefore, the pre-training module 171 allows to obtain a first generic set of training parameters, that may be used, as ML parameters 50, during a first use of the device 6 by a new user (i.e., database 20 does not comprise yet user physiological data).

According to one alternative embodiment, the device 1 for training is configured to directly receive a trained generic classification model (i.e., receive the uninitialized generic classification model plus trained ML parameters). In this case, the pre-training module 171 is only configured to receive the trained generic classification module and modules 111, 121, 131, 141, 151 and 161 are used to pre-processes and process the new data from a plurality of subjects with which is updated the database 10.

Device 1 further comprises a transfer learning module 181 for generating an updated fine-tuned user-specific model. FIGS. 3 and 5 provide an illustration of module 181, and its function in the device 1. Module 181 is configured to use a transfer learning technique using said trained generic classification model and the data associated to user physiological signals 51 which are iteratively received. Notably, module 181 may receive the features extracted from the pre-processed (i.e., by modules 122, 132 and 142) and processed (i.e., by modules 152 and 162) user physiological signals 51. The updated fine-tuned user-specific model is as well configured to provide as output a probability distribution over the different classes. The classes of the updated fine-tuned user-specific model may be the same classes of the trained generic classification model. However, it's also possible to adapt the model to different or additional classes. In other words, the updated fine-tuned user-specific model is a command classifier.

Transfer learning is a technique used in machine learning where a model that has been trained on one task is used as a starting point for a new task. In the present invention, transfer learning advantageously allows to improve the performance of the BCI user-specific machine learning system by transferring knowledge from the generic training dataset to the user dataset (i.e., data comprised in database 20). By using the trained generic classification model as a starting point, the new fine-tuned user-specific model can learn to classify the physiological data from the users more quickly and accurately. Transfer learning advantageously allows one to adapt a BCI system to a user by fine-tuning the trained generic classification model based on data collected from that user. This approach is useful in the context of the present invention where limited data are available for a specific user.

In one example, module 181 is configured to process the neurophysiological signal separately from the other signals. In the case of neurophysiological signals, the module 181 performs a Tangent Space Alignment (TSA), which is a method that aligns the tangent spaces of the feature representations of the data from the source dataset (i.e., data from a plurality of subjects) and target dataset (i.e., data from the user). The tangent space of a point on a Riemannian manifold is the linear space of all possible directions at that point, and it can be used to represent the local geometry of the manifold at that point. By aligning the tangent spaces of the feature representations of the data from the source and target dataset, TSA can help ensure that the model is well-suited to the local geometry of the data from the target dataset, which can help improve the performance of the updated fine-tuned user-specific model on the target dataset.

Module 181 is configured to first compute one covariance matrix for the features extracted (from neurophysiological signals) for each floating time window obtained from the iteratively received sets of user physiological signals 51. The computed covariance matrices are then projected into a tangent space to obtain a tangent space of user features representation. A second step is implemented to align said tangent space of subject features representation with said tangent space of user features representation.

In the case of first use of the devices 1 and 6, an initialization/calibration of the trained generic classification model is needed to adapt it to the new user (i.e., not in the plurality of subjects of the database 10). Indeed, in this case the only model available is the trained generic classification model (i.e., no previously obtained fine-tuned user-specific model is available) and therefore the first (updated) fine-tuned user-specific model is obtained from the trained generic classification model using said aligned tangent spaces.

In the case of iterations of the device 1 successive to this first initialization, when one fine-tuned user-specific model has already been calculated at least once, the previously obtained fine-tuned user-specific model (preferably the one obtained during the latest iteration) is updated using said Tangent Space Alignment to obtain a currently updated fine-tuned user-specific model.

Once the updated fine-tuned user-specific model is obtained, module 181 feeds the features extracted by the pre-processed and processed user's physiological signal to said updated fine-tuned user-specific model to obtain at least one class prediction or probability distribution over the different classes.

Device 1 may further comprise a module 191 for early stopping algorithm.

FIGS. 3 and 5 provide an illustration of module 191, and its function in the device 1. The early stopping algorithm is configured to receive as input at least two probability distributions of the plurality of classes obtained from two successive input samples (i.e., calculated successively by said updated user-specific model) and provides as output an updated probability distribution for the plurality of classes being associated to one executable command of a brain-computer interface. This early stopping algorithm may be optimized using class predictions previously obtained from the updated fine-tuned user-specific model obtaining optimized parameters for said early stopping algorithm. In one example, the early stopping algorithm is a Cumulative Probabilities Accumulation algorithm. Preferably, the Cumulative Probabilities Accumulation algorithm is a Bayesian Accumulation of Riemannian Probabilities (BARP).

The device 1 for training further comprises a module 200 for mapping the cumulative probability distributions to BCI commands. FIGS. 3 and 5 provide an illustration of module 200, and its function in the device 1. As for module 67, module 200 is configured to access the cumulative probability distributions in the buffer and continuously evaluate if a predefined level of confidence is reached for the cumulative probability in said buffer for the different classes, so to select at least one executable command 71 associated to the class that has reached said predefined level of confidence. The device 1 for training may implement the same features that module 67 of device 6.

The device 1 may further comprise a module 201 for evaluating the performances of the current training parameters of said trained fine-tuned user-specific model and said current optimized parameter of the optimized early stopping algorithm associated with the current user-specific machine learning system. FIGS. 3 and 5 provide an illustration of module 201, and its function in the device 1. Module 201 may take into account two factors, voluntary feedback and passive feedback. In the case of voluntary user feedback, the user may be asked to provide feedback on the accuracy of the BCI executable commands via the user interface 69, such as by pressing a button or making a verbal response. This feedback may be used to calculate a classification accuracy or a hit rate, which is the percentage of correct executable commands given by the BCI system. Then a quality metric of the current user-specific machine learning system (i.e., device 6 using current trained ML parameters 50) is obtained using this voluntary user feedback.

In the second case, passive feedback is obtained based on the user's cognitive state. This can be done by monitoring physiological signals, such as the electroencephalogram (EEG), which can provide information about the user's cognitive state. For example, P300 or error-related potentials (ErrP) are signals that are associated with cognitive processes such as attention and error detection. These signals can be used to infer the user's cognitive state and to calculate a quality metric of the current user-specific machine learning system, such as a detection rate, which is the percentage of times the BCI system correctly detects the user's cognitive state.

A combination of both voluntary and passive feedback can also be used to obtain a quality metric of the current user-specific machine learning system. This allows a more comprehensive evaluation of the system and to have a more accurate measure of the performance.

Module 201 may then generate a set of labeled user physiological signals by associating the at least two user physiological signals used as input of the current user-specific machine learning system with the corresponding output executable command. This set of labeled user physiological signals is only generated if the quality metric satisfies a predefined quality criterion. These sets of labeled user physiological signals generated by module 201 may be saved in the database 10. Preferably, the sets of labeled user physiological signals are anonymized before being stored in the database 10.

Optionally, device 6 may comprise an anonymization (pseudo-anonymization) module configured to anonymize the sets of labeled user physiological signals and store this anonymized data into a database 10, accessible by the device 1 for training (described below). The anonymization module advantageously allows to ensure the privacy and confidentiality of sensitive information while storing the data. It may employ various methods to protect the identity of subjects/users and mitigate the risk of re-identification.

The anonymization module may employ techniques like generalization or suppression to further reduce the risk of identification. Generalization involves replacing precise values with broader categories, while suppression involves removing or redacting certain data points altogether. By combining these methods, the anonymization module safeguards the privacy of subjects while retaining the integrity and usefulness of the physiological data for analysis and research purposes.

The device 1 may further comprise a module 202 for online incremental reinforcement learning. FIGS. 3 and 5 provide an illustration of module 202, and its function in the device 1. Module 202 is configured to implement an incremental reinforcement learning (IRL) technique (such as Q-learning or Markov decision process) to advantageously make the fine-tuned user-specific model learn and adapt to new information and changing conditions over time. Module 202 may implement adaptive signal processing, wherein IRL can be used to adapt the signal processing techniques used in the device 1, such as filtering and feature extraction, to improve the quality of the physiological signals and increase the accuracy of the executable commands provided.

Alternative or in addition module 202 may implement adaptive classifier training, wherein IRL can be used to adapt the classifier used in the device 1, notably pretrained in the pre-training module 171, such as a linear discriminant analysis (LDA) or support vector machine (SVM) with RBF (Radial Basis Function), linear or quantum based, kernels (i.e., RBF kernels), to improve its ability to distinguish between different mental commands or other physiological signals features. Advantageously, the support vector machine (SVM) with quantum-based kernels provides improved results. Alternatively, the IRL may use logistic regression.

Alternative or in addition module 202 may implement adaptive control or communication, wherein IRL can be used to adapt the control or communication strategies used in the BCI system, such as mapping mental commands to specific actions or movements, to improve the user's control over the external devices or communication with others.

Alternative or in addition module 202 may implement continuous learning, wherein IRL allows the device 1 to learn and adapt to new information and changing conditions over time, which is especially useful in the context of the present invention as the user's physiological signals can change over time due to various factors such as fatigue, stress, changes in mental state and other factors.

The invention claimed is:

1. A device for training a user-specific machine learning system configured to associate physiological signals, being multimodal physiological signals, from a user with a command of a multimodal brain-computer interface, said device comprising:

at least one input configured to receive sets of physiological signals acquired from a plurality of subjects from a database, and iteratively receive at least one set of physiological signals acquired from the user, each set of physiological signals comprising at least two physiological signals being acquired by at least two distinct sensors, wherein one of the at least two physiological signals is a neurophysiological signal acquired from at least one electrode of an electroencephalograph on one subject of said plurality of subjects or said user; wherein the physiological signals of said sets from the database are associated to labels;

at least one processor configured obtain said user-specific machine learning system by:

dividing each received physiological signal into at least one floating time window, each floating time window being associated to an event of interest in said received physiological signal;

extracting features from floating time windows derived from dividing said neurophysiological signals of said sets of subjects' physiological signals from the plurality of subjects: computing a covariance matrix for each floating time window, projecting said covariance matrix into a tangent space of subjects features representation and extracting said features from said projection in the tangent space;

extracting features from said floating time windows derived from dividing said physiological signals, excluding the neurophysiological signals, from the plurality of subjects;

generating a generic training dataset using said features extracted from said sets of physiological signals acquired from a plurality of subjects;

training a generic classification model using said generic training dataset so to obtain a trained generic classification model configured to associate an input to one class, among a plurality of classes; said input comprising at least said features extracted from at least one set of physiological signals acquired from a user, being measured by at least two distinct sensors, wherein one of the at least two physiological signals is a neurophysiological signal; and each class of said plurality of classes being associated to one executable command of a brain-computer interface;

generating an updated fine-tuned user-specific model on the base of said trained generic classification model for each iteratively received set of user physiological signals using a transfer learning technique, said updated fine-tuned user-specific model being configured to provide as output class prediction;

obtaining probability distributions for said plurality of classes by feeding features obtained from at least one iteratively received set of user physiological signals to said updated fine-tuned user-specific model;

optimizing an AI agent with an early stopping algorithm using class predictions previously obtained from the updated fine-tuned user-specific model obtaining optimized parameter for said early stopping algorithm; wherein said early stopping algorithm is configured to receive as input at least two probability distributions of said plurality of classes obtained from two successive input of said updated fine-tuned user-specific model and provides as output an updated probability distribution for the plurality of classes being associated to one executable command of a brain-computer interface;

wherein said user-specific machine learning system comprises said updated fine-tuned user-specific model, said optimized AI agent and mapping rules configured to associate said updated probability distribution to one executable command for said brain-computer interface;

at least one output configured to provide at least the training parameters of said updated fine-tuned user-specific model and said optimized parameter of the optimized early stopping algorithm and said mapping rules.

2. The device according to claim 1, wherein generating said updated fine-tuned user-specific model using a transfer learning technique, comprises:

obtaining a tangent space of user features representation of the neurophysiological signals of said iteratively received set of user physiological signals;

aligning said tangent space of subjects features representation with said tangent space of user features representation;

during a first user-specific calibration of said user-specific machine learning system, updating said trained generic classification model using said aligned tangent spaces, obtaining updated training parameters for said updated fine-tuned user-specific model, or else updating a previously obtained fine-tuned user-specific model obtaining updated training parameters for said updated fine-tuned user-specific model.

3. The device according to claim 1, wherein additional features are from augmented floating time windows generated by performing data augmentation on floating time windows derived from dividing said sets of subjects' physiological signals.

4. The device according to claim 1, wherein said early stopping algorithm is a Cumulative Probabilities Accumulation algorithm, preferably Cumulative Probabilities Accumulation algorithm is a Bayesian Accumulation of Riemannian Probabilities (BARP).

5. The device according to claim 3, wherein the at least one processor is further configured to:

before using transfer learning technique, obtain an information representative of effectiveness and robustness of the previously obtained fine-tuned user-specific model; and whenever the effectiveness and robustness are not satisfying a predefined rule, perform data augmentation of the iteratively received set of user physiological signals or perform data augmentation of a covariance matrix computed using the iteratively received set of user physiological signals, and obtain said tangent space of user features representation using said augmented user physiological signals or augmented user covariance matrix.

6. The device according to claim 1, wherein the training of said trained generic classification model is a weakly or fully supervised training.

7. The device according to claim 1, wherein the at least one processor is further configured to, prior to generating said generic training dataset, sort said floating time windows based on a signal quality index computation and remove from the generic training data the n floating time windows, n being a predefined natural number, having the lowest signal quality index.

8. The device according to claim 1, wherein the at least one processor is configured to implement an incremental reinforcement learning technique:

obtain a quality metric of the current user-specific machine learning system using a user feedback or a passive feedback based on a mental state of the user, calculated with the latest received at least one set of physiological signals acquired from the user;

whenever the quality metric satisfies a predefined quality criterion generate at least one set of labeled user physiological signals by associating at least two user physiological signals used as input of the current user-specific machine learning system with the corresponding outputted executable command and save said set of labeled user physiological signals in the database.

9. The device according to claim 1, wherein, said executable command belongs to one among an active command associated to a voluntary action of said user or to a passive command associated to a mental state of said user.

10. The device according to claim 1, wherein the at least one processor is further configured to, prior to dividing said at least two physiological signals into floating time windows, remove artifacts from said at least two physiological signals.

11. The device according to claim 1, wherein said at least one processor is further configured to implement phase correction and filtering on said at least two physiological signals.

12. A device for associating physiological signals from a user, said physiological signals being multimodal physiological signals, with commands of a brain-computer interface using a trained user-specific machine learning system obtained using the device according to claim 1, wherein said device comprises:

at least one input configured to iteratively receive at least one set of physiological signals acquired from said user, each set of physiological signals comprising at least two physiological signals being measured by at least two distinct sensors, wherein one of the at least two physiological signals is a neurophysiological signal acquired from at least one electrode of an electroencephalograph on said user;

at least one processor configured to:

divide each received physiological signal of said at least one set of physiological signals into at least one floating time windows, each floating time windows being associated to an event of interest in said received physiological signal;

extract features from floating time windows derived from dividing said neurophysiological signal of said at least one set of physiological signals: computing a covariance matrix for each floating time window, projecting said covariance matrix into a tangent space of features representation and extracting said features from said projection in the tangent space of features;

extract features from said floating time windows derived from dividing said at least one set of physiological signals, excluding the neurophysiological signals;

obtaining probability distributions for a plurality of classes by sequentially providing said features extracted from said at least one set of physiological signals as input to an updated fine-tuned user-specific model of said trained user-specific machine learning system, the updated fine-tuned user-specific model being configured to classify each floating time window, and obtaining as output a classification of each floating time window into one class, from said plurality of classes; each class of said plurality of classes being associated to one executable command of a brain-computer interface;

provide as input to an AI agent, comprising an optimized early stopping algorithm of said trained user-specific machine learning system, at least two probability distributions of said plurality of classes obtained from two successive floating windows, so to obtain as output an updated probability distribution for said plurality of classes associated to the latest floating time window obtained from the iteratively received user set of physiological signals;

cumulate said probability distributions of said plurality of classes for each floating time window to a buffer;

whenever a predefined level of confidence is reached for the cumulative probability in said buffer for one class, select at least one executable command associated to said class;

at least one output configured to provide said selected at least one executable command.

13. The device according to claim 12, wherein said at least one processor is further configured to perform a quality check by calculating a signal quality index on said user set of physiological signals, to obtain information allowing to prompt said user to adjust said at least two distinct sensors if a quality criterion is not met by said computed quality check.

14. The device according to claim 12, wherein floating time windows are ignored during a recovery period applied after each selection of at least one executable command.

15. The device according to claim 12, wherein the predefined level of confidence is defined as a ratio between the probabilities associated to the two most probable classes.

16. A computer-implemented method for training a user-specific machine learning system configured to associate physiological signals, being multimodal physiological signals, from a user with a command of a multimodal brain-computer interface, said method comprising:

receiving sets of physiological signals acquired from a plurality of subjects from a database, and iteratively receive at least one set of physiological signals acquired from the user, each set of physiological signals comprising at least two physiological signals being acquired by at least two distinct sensors, wherein one of the at least two physiological signals is a neurophysiological signal acquired from at least one electrode of an electroencephalograph on one subject of said plurality of subjects or said user; wherein the physiological signals of said sets from the database are associated to labels;

obtaining said user-specific machine learning system by:
dividing each received physiological signal into at least one floating time window, each floating time window being associated to an event of interest in said received physiological signal;
extracting features from floating time windows derived from dividing said neurophysiological signals of said sets of subjects' physiological signals from the plurality of subjects: computing a covariance matrix for each floating time window, projecting said covariance matrix into a tangent space of subjects features representation and extracting said features from said projection in the tangent space;
extracting features from said floating time windows derived from dividing said physiological signals, excluding the neurophysiological signals, from the plurality of subjects;
generating a generic training dataset using said features extracted from said sets of physiological signals acquired from a plurality of subjects;
training a generic classification model using said generic training dataset so to obtain a trained generic classification model configured to associate an input to one class, among a plurality of classes; said input comprising at least said features extracted from at least one set of physiological signals acquired from a user, being measured by at least two distinct sensors, wherein one of the at least two physiological signals is a neurophysiological signal; and each class of said plurality of classes being associated to one executable command of a brain-computer interface;
generating an updated fine-tuned user-specific model on the base of said trained generic classification model for each iteratively received set of user physiological signals using a transfer learning technique, said updated fine-tuned user-specific model being configured to provide as output class prediction;
obtaining probability distributions for said plurality of classes by feeding features obtained from at least one iteratively received set of user physiological signals to said updated fine-tuned user-specific model;
optimizing an AI agent with an early stopping algorithm using class predictions previously obtained from the updated fine-tuned user-specific model obtaining optimized parameter for said early stopping algorithm; wherein said early stopping algorithm is configured to receive as input at least two probability distributions of said plurality of classes obtained from two successive input of said updated fine-tuned user-specific model and provides as output an updated probability distribution for the plurality of classes being associated to one executable command of a brain-computer interface;
wherein said user-specific machine learning system comprises said updated fine-tuned user-specific model, said optimized AI agent and mapping rules configured to associate said updated probability distribution to one executable command for said brain-computer interface;

providing at least the training parameters of said updated fine-tuned user-specific model and said optimized parameter of the optimized early stopping algorithm and said mapping rules.

17. A computer-implemented method for associating physiological signals from a user, said physiological signals being multimodal physiological signals, with commands of a brain-computer interface using a trained user-specific machine learning system obtained using the device according to claim 1, wherein said method comprises:

iteratively receiving at least one set of physiological signals acquired from said user, each set of physiological signals comprising at least two physiological signals being measured by at least two distinct sensors, wherein one of the at least two physiological signals is a neurophysiological signal acquired from at least one electrode of an electroencephalograph on said user;

dividing each received physiological signal of said at least one set of physiological signals into at least one floating time windows, each floating time windows being associated to an event of interest in said received physiological signal;

extracting features from floating time windows derived from dividing said neurophysiological signal of said at least one set of physiological signals: computing a covariance matrix for each floating time window, projecting said covariance matrix into a tangent space of features representation and extracting said features from said projection in the tangent space of features;

extracting features from said floating time windows derived from dividing said at least one set of physiological signals, excluding the neurophysiological signals;

obtaining probability distributions for a plurality of classes by sequentially providing said features extracted from said at least one set of physiological signals as input to an updated fine-tuned user-specific model of said trained user-specific machine learning system, the updated fine-tuned user-specific model being configured to classify each floating time window, and obtaining as output a classification of each floating time window into one class, from said plurality of classes; each class of said plurality of classes being associated to one executable command of a brain-computer interface;

providing as input to an AI agent, comprising an optimized early stopping algorithm of said trained user-specific machine learning system, at least two probability distributions of said plurality of classes obtained from two successive floating windows, so to obtain as output an updated probability distribution for said plurality of classes associated to the latest floating time window obtained from the iteratively received user set of physiological signals;

cumulating said probability distributions of said plurality of classes for each floating time window to a buffer;

whenever a predefined level of confidence is reached for the cumulative probability in said buffer for one class, select at least one executable command of said brain-computer interface associated to said class;

providing said selected at least one executable command of said brain-computer interface.

* * * * *